No. 651,488. Patented June 12, 1900.
E. A. LLOYD.
VARIABLE SPACING GAGE FOR TYPE WRITING CYLINDERS.
(Application filed Aug. 17, 1899.)
(No Model.)

Witnesses:
Isabella H. Lloyd
Adelaide C. Lloyd

Inventor:
Edith Alicia Lloyd

UNITED STATES PATENT OFFICE.

EDITH ALICIA LLOYD, OF IOWA CITY, IOWA.

VARIABLE-SPACING GAGE FOR TYPE-WRITING CYLINDERS.

SPECIFICATION forming part of Letters Patent No. 651,488, dated June 12, 1900.

Application filed August 17, 1899. Serial No. 727,578. (No model.)

*To all whom it may concern:*

Be it known that I, EDITH ALICIA LLOYD, a citizen of the United States, residing at Iowa City, in the county of Johnson and State of Iowa, have invented a new and useful attachment, called the "variable-spacing gage," adapted to the cylinder of a type-writer furnished with the variable spacer, of which the following is a specification.

My invention relates to convenience in arbitrary line-spacing in type-writers furnished with the variable spacer; and the object of my attachment is to furnish a scale adapted for measurement in connection with variable spacing. I attain this object by means of the attachment illustrated in the accompanying drawings, in which—

Figure 1:
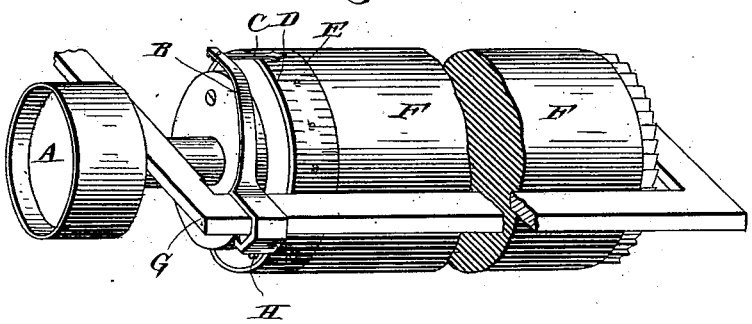
Figure 2:
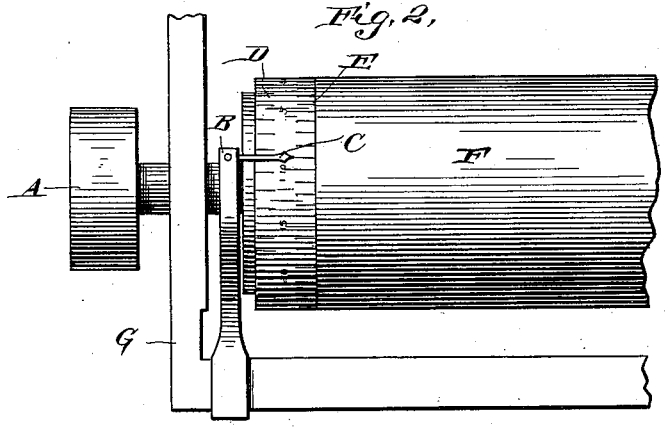
Figure 3:
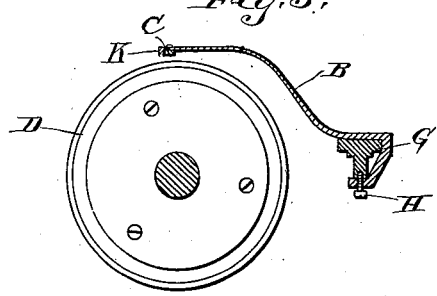

Figure 1 is a front view of the carriage of the Remington type-writer. Fig. 2 is a top view of the left end of the cylinder, to which one part of my invention is to be attached. Fig. 3 is a view of the end of the cylinder, showing the support B and manner of its attachment to the frame of the carriage G.

Similar letters refer to similar parts in the several figures.

In naming the parts of the type-writer necessarily referred to in the description I have followed the nomenclature of the Remington type-writer.

My invention consists, first, of two parts D E, which represent a graduated band of any suitable material, whose exterior circumference is the circumference of the cylinder F, to which it is to be attached. This graduated band is furnished with two scales, one on the outer edge D of the band and one on the inner edge E of the band. The scale on the edge E corresponds with the cylinder-scale, which is in immediate contact with the paper and not in view except when the carriage is raised, and the front scale being the scale on the front of the carriage. The scale on the edge E furnishes a measure for perpendicular spacing calculated to keep the space in which the letters occur perpendicularly exactly equal to that space in which the letters fall horizontally, if so desired. The scale on the edge D corresponds exactly to the space of the notches of the ratchet adjusted to space the lines.

The correspondence between the divisions of my scale and the notches of the ratchet secures two objects—first, a means of locating the writing at any desired line, whether such line is a line determined by the notches on the ratchet-wheel or not, and, second, after such line is located the use, if desired, of the space or multiples thereof, which would be determined by the ratchet-notches were the variable spacer not in use.

The practical value of each of the scales will be found in writing on ruled paper, where it is desired to keep a distance between the lines which is at variance with the distance provided for by the means already in use.

The second part of my invention is a pointer C, which is so hinged that it can be folded out of the way when not in use, and a support B for the same, which is provided with a stop K at its extremity to stop the pointer C at right angles with B and parallel with the cylinder. The support B is attached to the carriage conveniently by a thumb-screw H. By means of the pointer the distance for turning the cylinder can be regulated by the writer. These two parts of my attachment are designed to be used in connection with the variable spacer, such as is employed in the Remington type-writer.

When the variable spacer is employed, which removes the pressure of the stop-spring from the ratchet-wheel, so that the cylinder stop-spring is removed from the ratchet, the cylinder is free to be turned any arbitrary distance, and the scale in my invention enables the writer to fix and keep that distance as long as he wishes.

The whole combination secures to the writer the means of keeping a definite arbitrary distance for turning the cylinder without lifting the carriage by the guidance of the pointer touching the dividing-lines on the graduated band.

What I claim as my invention, and desire to secure by Letters Patent, is as follows:

In a type-writer, the combination with the cylinder of a band graduated at the inner and outer edges, attached to the cylinder, the graduations corresponding to the graduations upon the front scale and the cylinder-scale and the notches of the cylinder-ratchet respectively, and of the hinged pointer with the support therefor, substantially as described.

EDITH ALICIA LLOYD.

Witnesses:
ISABELLE H. LLOYD,
L. C. W. CLEARMAN.